(12) United States Patent
Iwamoto et al.

(10) Patent No.: US 11,163,765 B2
(45) Date of Patent: Nov. 2, 2021

(54) NON-TRANSITORY COMPUYER-READ ABLE STORAGE MEDIUM, INFORMATION OUTPUT METHOD, AND INFORMATION PROCESSING APPARATUS

(71) Applicant: FUJITSU LIMITED, Kawasaki (JP)

(72) Inventors: Kayoko Iwamoto, Kawasaki (JP); Ryuichi Takagi, Nakano (JP)

(73) Assignee: FUJITSU LIMITED, Kawasaki (JP)

( * ) Notice: Subject to any disclaimer, the term of this patent is extended or adjusted under 35 U.S.C. 154(b) by 222 days.

(21) Appl. No.: 15/949,698

(22) Filed: Apr. 10, 2018

(65) Prior Publication Data
US 2018/0307725 A1 Oct. 25, 2018

(30) Foreign Application Priority Data
Apr. 19, 2017 (JP) .............................. JP2017-082916

(51) Int. Cl.
*G06F 15/16* (2006.01)
*G06F 16/2453* (2019.01)
*G06F 16/93* (2019.01)
*G06F 16/248* (2019.01)
*G06F 16/25* (2019.01)
(Continued)

(52) U.S. Cl.
CPC ...... *G06F 16/24539* (2019.01); *G06F 16/248* (2019.01); *G06F 16/252* (2019.01); *G06F 16/334* (2019.01); *G06F 16/3322* (2019.01); *G06F 16/3325* (2019.01); *G06F 16/93* (2019.01)

(58) Field of Classification Search
None
See application file for complete search history.

(56) References Cited

U.S. PATENT DOCUMENTS

2008/0201287 A1* 8/2008 Takeuchi .............. G06Q 30/08
706/46
2009/0077065 A1* 3/2009 Song ................... G06F 16/3326
(Continued)

FOREIGN PATENT DOCUMENTS

| JP | 02-245971 | 10/1990 |
|---|---|---|
| JP | 09-101969 | 4/1997 |

(Continued)

OTHER PUBLICATIONS

Japanese Office Action dated Dec. 1, 2020 for corresponding Japanese Patent Application No. 2017-082916, with, Machine Translation, 9 pages.

*Primary Examiner* — Alex Gofman
(74) *Attorney, Agent, or Firm* — Fujitsu Patent Center

(57) ABSTRACT

A non-transitory computer-readable storage medium storing a program that causes a computer to execute a process, the process including receiving a search query, obtaining a first document containing a word included in the received search query from a storage device that stores a plurality of documents, extracting a plurality of words included in the first document, selecting one or more words from the plurality of extracted words, the one or more words having lower similarity to the word included in the received search query being specified in the specifying, obtaining a second document containing the selected one or more words, and outputting information corresponding to the second document.

9 Claims, 18 Drawing Sheets

(51) Int. Cl.
    *G06F 16/332*    (2019.01)
    *G06F 16/33*     (2019.01)

(56) References Cited

U.S. PATENT DOCUMENTS

| | | | |
|---|---|---|---|
| 2010/0094896 A1* | 4/2010 | Ozawa | H04N 5/44543 |
| | | | 707/769 |
| 2013/0268535 A1* | 10/2013 | Inaba | G06F 16/35 |
| | | | 707/740 |
| 2016/0019304 A1* | 1/2016 | Kim | G06F 16/338 |
| | | | 707/722 |
| 2016/0189034 A1* | 6/2016 | Shakeri | G09B 5/00 |
| | | | 706/47 |
| 2017/0154077 A1* | 6/2017 | Kang | G06F 16/36 |

FOREIGN PATENT DOCUMENTS

| | | |
|---|---|---|
| JP | 2007-094552 | 4/2007 |
| JP | 2014-215826 A | 11/2014 |

\* cited by examiner

FIG. 3

| No. | SEARCH QUERY AND SEARCH RESULT | CATEGORY |
|---|---|---|
| 1 | *SORA NO IRO WA NANIIRO DESUKA* <br> (WHAT COLOR IS THE COLOR OF SKY?) | QUESTION |
| 2 | *HIRUMA NO SORA WA AOI* <br> (THE SKY AT DAYTIME IS BLUE) | ANSWER |
| 3 | *ASA YA YUGATA NO SORA WA AKAI* <br> (THE SKY AT MORNING AND EVENING IS RED) | ANSWER |
| 4 | *YORU NO SORA WA KUROI* <br> (THE SKY AT NIGHT IS BLACK) | ANSWER |

FIG. 4

| No. | WORD GROUP | CATEGORY |
|---|---|---|
| 1 | *SORA* (SKY), *NO* (OF), *IRO* (COLOR), *WA* (N/A), *NANIIRO* (WHAT COLOR), DESU (IS), KA (?) | QUESTION |
| 2 | *HIRUMA* (DAYTIME), *NO* (AT), *SORA* (SKY), *WA* (N/A), *AOI* (BLUE) | ANSWER |
| 3 | *ASA* (MORNING), *YA* (AND), *YUGATA* (EVENING), *NO* (AT), *SORA* (SKY), *WA* (N/A), *AKAI* (RED) | ANSWER |
| 4 | *YORU* (NIGHT), *NO* (AT), *SORA* (SKY), *WA* (N/A), *KUROI* (BLACK) | ANSWER |

FIG. 5

| No. | WORD | IDF | CATEGORY |
|---|---|---|---|
| 1 | *SORA* (SKY) | 0 | QUESTION |
| 2 | *NO* (OF) | 0 | QUESTION |
| 3 | *IRO* (COLOR) | 0.6 | QUESTION |
| 4 | *WA* (N/A) | 0 | QUESTION |
| 5 | *NANIIRO* (WHAT COLOR) | 0.6 | QUESTION |
| 6 | *DESU* (IS) | 0.6 | QUESTION |
| 7 | *KA* (?) | 0.6 | QUESTION |
| 8 | *HIRUMA* (DAYTIME) | 0.6 | ANSWER |
| 9 | *AOI* (BLUE) | 0.6 | ANSWER |
| 10 | *ASA* (MORNING) | 0.6 | ANSWER |
| 11 | *YA* (AND) | 0.6 | ANSWER |
| 12 | *YUGATA* (EVENING) | 0.6 | ANSWER |
| 13 | *AKAI* (RED) | 0.6 | ANSWER |
| 14 | *YORU* (NIGHT) | 0.6 | ANSWER |
| 15 | *KUROI* (BLACK) | 0.6 | ANSWER |

| No. | WORD GROUP | CATEGORY |
|---|---|---|
| 1 | COLOR, WHAT COLOR, IS, ? | QUESTION |
| 2 | DAYTIME, BLUE, MORNING, AND, EVENING, RED, NIGHT, BLACK | ANSWER |

FIG. 7

$KA\ (?) \longrightarrow [1, 0, 1]$
$YA\ (AND) \longrightarrow [1, 0, 0]$
$\cos \longrightarrow 0.70$ $$\cos(A, B) = \frac{A \times B}{|A||B|}$$
$$= \frac{1 \times 1 + 0 \times 0 + 1 \times 0}{\sqrt{2} \times \sqrt{1}}$$
$$= \frac{1}{\sqrt{2}} = 0.70$$

| No. | WORD | SIMILARITY | CATEGORY |
|---|---|---|---|
| 1 | DAYTIME | -0.85 | ANSWER |
| 2 | MORNING | -0.75 | ANSWER |
| 3 | EVENING | -0.72 | ANSWER |
| 4 | NIGHT | -0.70 | ANSWER |
| 5 | RED | 0.60 | ANSWER |
| 6 | BLUE | 0.62 | ANSWER |
| 7 | BLACK | 0.66 | ANSWER |
| 8 | AND | 0.70 | ANSWER |

NON-TRANSITORY COMPUYER-READABLE STORAGE MEDIUM, INFORMATION OUTPUT METHOD, AND INFORMATION PROCESSING APPARATUS

CROSS-REFERENCE TO RELATED APPLICATION

This application is based upon and claims the benefit of priority of the prior Japanese Patent Application No. 2017-82916, filed on Apr. 19, 2017, the entire contents of which are incorporated herein by reference.

FIELD

The embodiments discussed herein are related to a non-transitory computer-readable storage medium, an information output method, and an information processing apparatus.

BACKGROUND

There has been a conventional search system that receives inputted words. Such a search system receives one or more inputted words, performs AND search or the like using the received words, and outputs search results. Then, in the case of searching for a community, the search system performs a content search based on a representative word as a seed representing the community, extracts related words which are highly related to the representative word from among the search results, performs another content search based on each of the related words thus extracted, and then merges the search results for the representative word and a certain one(s) of the related words together.

Related techniques are disclosed in, for example, Japanese Laid-open Patent Publication Nos. 2007-094552, 9-101969, and 2-245971.

SUMMARY

According to an aspect of the invention, a non-transitory computer-readable storage medium storing a program that causes a computer to execute a process, the process including receiving a search query, obtaining a first document containing a word included in the received search query from a storage device that stores a plurality of documents, extracting a plurality of words included in the first document, selecting one or more words from the plurality of extracted words, the one or more words having lower similarity to the word included in the received search query being specified in the specifying, obtaining a second document containing the selected one or more words, and outputting information corresponding to the second document.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a search query and search results of a first search;

FIG. 4 is a diagram illustrating an example of morphological analysis;

FIG. 5 is a diagram illustrating an example of an IDF of each word;

FIG. 6 is a diagram presenting an example of high-IDF words;

FIG. 7 is a diagram illustrating an example of vector conversion and similarity calculation;

FIG. 8 is a diagram illustrating an example in which words are sorted in ascending order of similarity;

DESCRIPTION OF EMBODIMENTS

A search using search query words and a word highly related to the search query words, however, may face a difficulty in obtaining search results desired by a user who wants to conduct the search, unless the search query words include an important word. This may result in a failure in obtaining search results desired by the user and accordingly a decrease in the search accuracy.

In one aspect, the embodiments discussed herein aim at enhancing the search accuracy.

Hereinafter, the embodiments of information output programs, information output methods, and information processing apparatuses disclosed in the present specification are described in detail based on the drawings. It is to be noted that the following embodiments are not intended to limit the disclosed technique. In addition, the following embodiments may be combined in any way as appropriate unless the combination does not cause a conflict.

Embodiment 1

Figure 1:
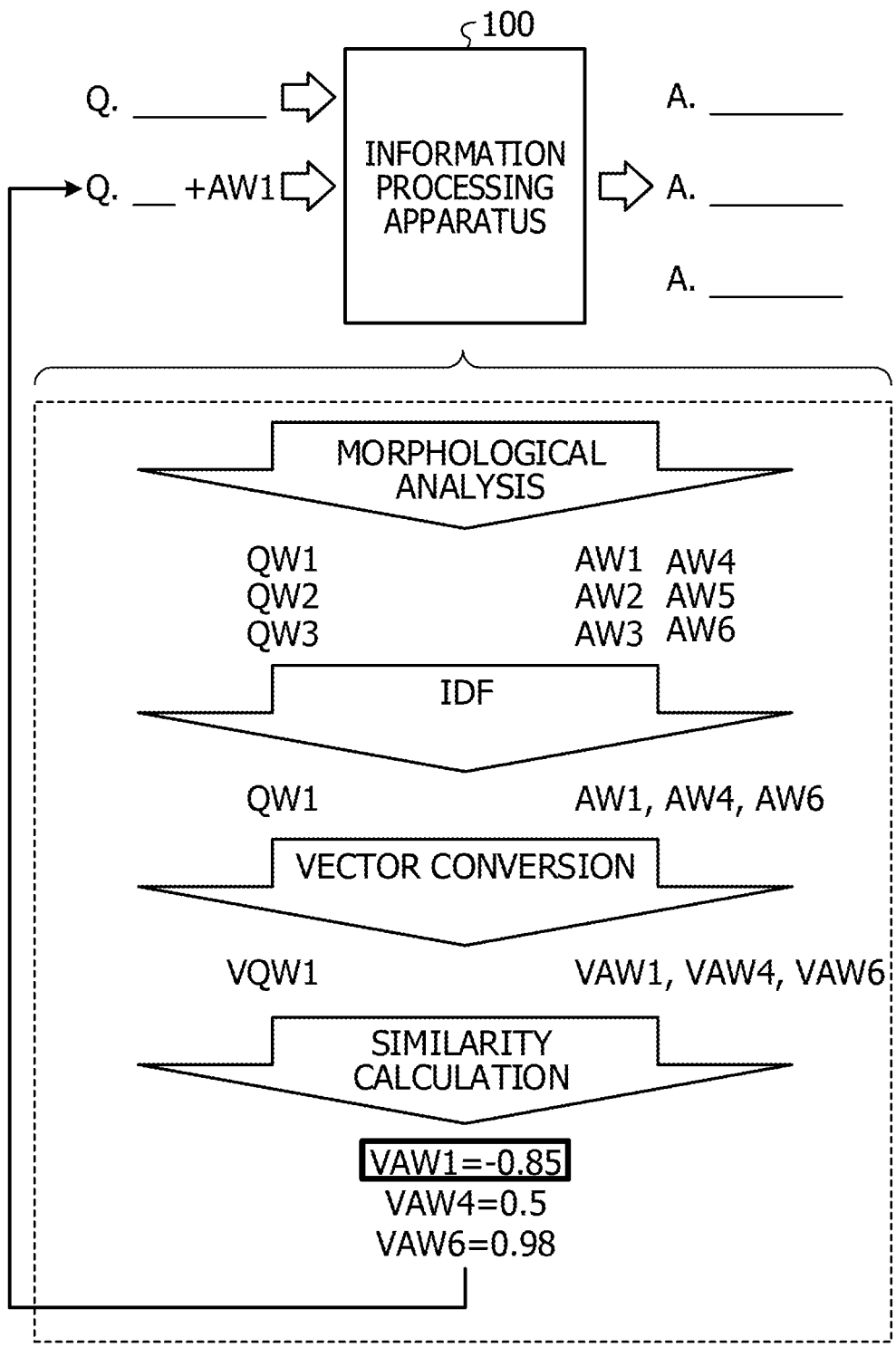
FIG. 1 is a diagram illustrating an example of a search in Embodiment 1.

First, by using FIG. 1, a flow of a search according to Embodiment 1 is described with attention paid to a search query. FIG. 1 is a diagram illustrating an example of a search in Embodiment 1. As illustrated in FIG. 1, an information processing apparatus 100 is an example of an information processing apparatus that outputs search results based on an inputted search query. As the information processing apparatus 100, a stationary or portable personal computer may be used, for example. In addition, as a portable terminal for the information processing apparatus 100, a tablet terminal, for example, may be employed besides the aforementioned portable personal computer. It is to be noted that the following description is provided on the premise that a "document" contains sentences, and a sentence is sometimes used in place of a document for the explanation.

The information processing apparatus 100 receives input of "Q._" (a search target phrase including multiple words) as a search query from a user, for example. The information processing apparatus 100 retrieves search results based on the inputted search query by referring to a storage unit that stores multiple documents. The information processing apparatus 100 extracts words by morphologically analyzing the search query and the search results. In the example in FIG. 1, among the words thus extracted, three words "QW1" to "QW3" are extracted from the search query, and six words "AW1" to "AW6" are extracted from the search results.

Next, the information processing apparatus 100 calculates an inverse document frequency (IDF) of each of the extracted words, and extracts words each having the IDF equal to or higher than a threshold. In the example in FIG. 1, the words "QW1", "AW1", "AW4", and "AW6" are extracted. The information processing apparatus 100 converts the extracted words into vectors to obtain "VQW1", "VAW1", "VAW4", and "VAW6". The information processing apparatus 100 calculates similarity of each of the words "VAW1", "VAW4", and "VAW6" of the search results to the word "VQW1" of the search query. In the example in FIG. 1, their similarity calculated is "VAW1"=−0.85, "VAW4"=0.5, and "VAW6"=0.98. The information processing apparatus 100 presents the word "AW1" associated with the "VAW1" having the lowest similarity to the user as an important word, and receives input of "Q._"+"AW1" as a search query. The information processing apparatus 100 presents multiple search results "A._" for the search query "Q._"+"AW1" to the user.

To put it differently, the information processing apparatus 100 receives a search query. In reference to the storage unit that stores multiple documents, the information processing apparatus 100 retrieves a document containing a word in the received search query from among the multiple documents. The information processing apparatus 100 extracts multiple words contained in the retrieved document. The information processing apparatus 100 selects one or more words from the extracted words by using an algorithm that selects words by giving a higher priority to a word with lower similarity to the word in the received search query. The information processing apparatus 100 retrieves a document containing the selected one or more words from the multiple documents by referring to the storage unit. The information processing apparatus 100 outputs information on the retrieved document. In this way, the information processing apparatus 100 may achieve enhancement of the search accuracy.

Figure 2:
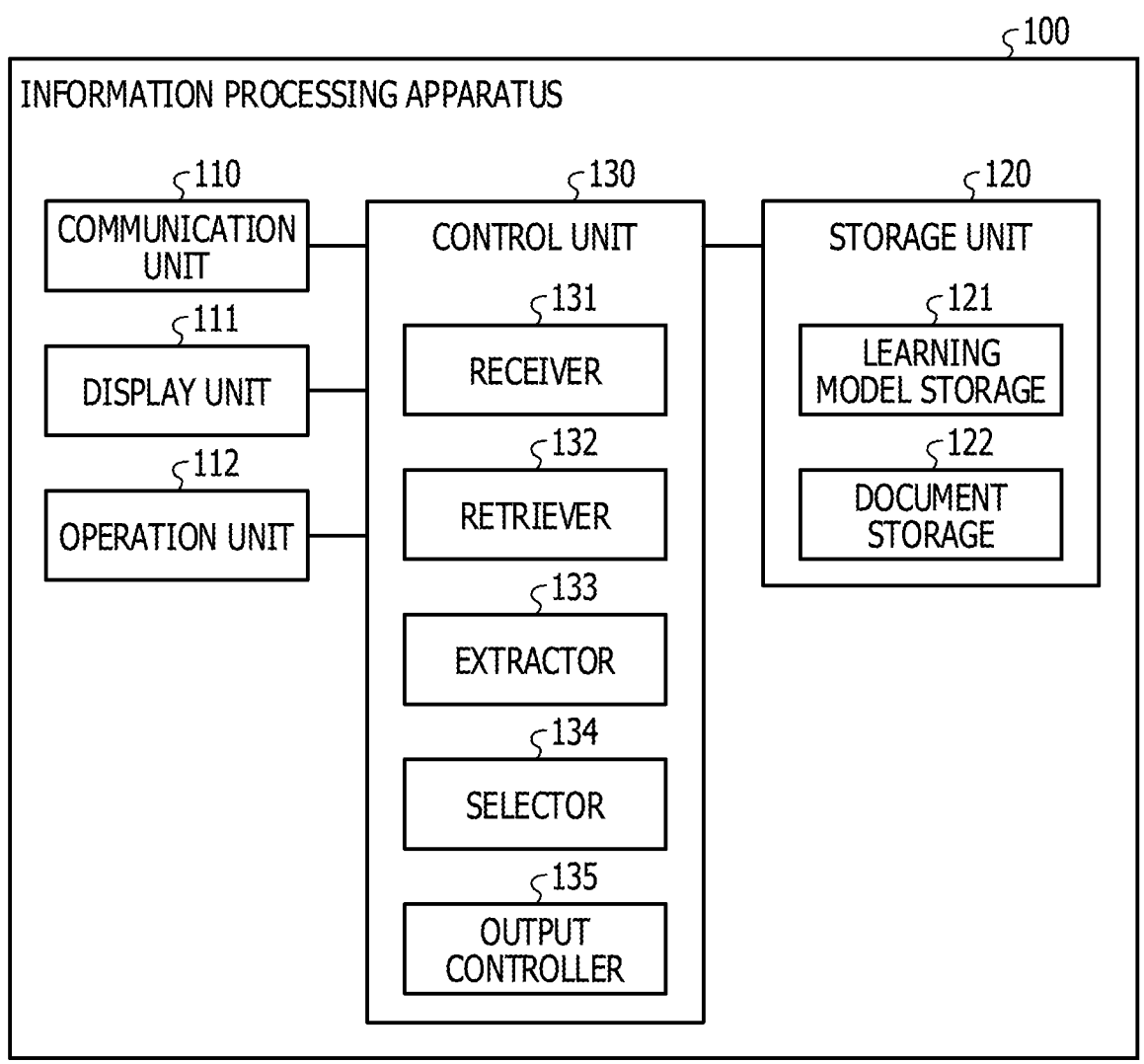
FIG. 2 is a block diagram illustrating a configuration example of an information processing apparatus in Embodiment 1.

Next, a configuration of the information processing apparatus 100 is described. FIG. 2 is a block diagram illustrating a configuration example of the information processing apparatus in Embodiment 1. The information processing apparatus 100 includes a communication unit 110, a display unit 111, an operation unit 112, a storage unit 120, and a control unit 130. Incidentally, the information processing apparatus 100 may include various functional units included in a known computer in addition to the functional units illustrated in FIG. 2, and may include, for example, various functional units such as an input device and a sound output device.

The communication unit 110 is implemented by, for example, a network interface card (NIC) or the like. The communication unit 110 is a communication interface that is coupled to another information processing apparatus via a network not illustrated by wireless or wired connection, and controls communications of information with the other information processing apparatus. The communication unit 110 receives, for example, training data or the like for generating a learning model from the other information processing apparatus. The communication unit 110 outputs the received training data or the like to the control unit 130.

The display unit 111 is a display device that displays various kinds of information. The display unit 111 is implemented, for example, as a display device by a liquid crystal display or the like. The display unit 111 displays various screens such as display screens inputted from the control unit 130.

The operation unit 112 is an input device that receives various operations performed by a user of the information processing apparatus 100. The operation unit 112 is implemented, for example, as input devices by a keyboard, a mouse, and the like. The operation unit 112 outputs an operation inputted by the user as operation information to the control unit 130. Here, the operation unit 112 may be implemented as an input device by a touch panel or the like, and a display device as the display unit 111 and an input device as the operation unit 112 may be integrated together.

The storage unit 120 is implemented by, for example, a semiconductor memory element such as a random access memory (RAM) or a flash memory or a storage device such as a hard disk or an optical disk. The storage unit 120 includes a learning model storage 121 and a document storage 122. In addition, the storage unit 120 stores information for use in the processing by the control unit 130.

The learning model storage 121 stores a learning model that is machine learned based on training data. The learning model stored in the learning model storage 121 is, for example, a learning model that is machine learned from data, received as training data, of a manual of a given system, a glossary of general terms for a call center, and the like, for example. In other words, the learning model stored in the learning model storage 121 is a learning model that is machine learned about the field targeted for information output processing, namely, search processing to be provided by the information processing apparatus 100.

The document storage 122 stores multiple documents to be searched. The document storage 122 stores, as documents, for example, the manual of the given system, the glossary of general terms for the call center, and the like used in the training. In addition, the document storage 122 may store other documents. The document storage 122 may be included in an external search engine in the case where the external engine is used for search.

The control unit 130 is implemented in a way where, for example, a central processing unit (CPU), a micro processing unit (MPU), or the like executes a program stored in an internal storage device by using a RAM as a work area. Instead, the control unit 130 may be implemented, for example, by an integrated circuit such as an application specific integrated circuit (ASIC) or a field programmable gate array (FPGA).

The control unit 130 includes a receiver 131, a retriever 132, an extractor 133, a selector 134, and an output controller 135, and implements or executes functions and actions in information processing described below. In other words, the processing units in the control unit 130 implement the information output processing. Note that the internal configuration of the control unit 130 is not limited to the configuration illustrated in FIG. 2, but may be any other configuration capable of performing the information processing described below.

The receiver 131 receives a search query inputted according to an operation performed on the operation unit 112 by a user, for example. The receiver 131 outputs the received search query to the retriever 132. In addition, while the display unit 111 displays important words as options submittable by the user under the control of the output controller 135, the receiver 131 determines whether or not the receiver 131 has received a submission of any of the important words. If the receiver 131 has received a submission of an important word, the receiver 131 adds the received important word to the search query to create a new search query, and outputs the new search query to the retriever 132. Meanwhile, if the receiver 131 has not received a submission of an important word, the receiver 131 terminates the information output processing for the search.

Upon input of the search query from the receiver 131, the retriever 132 searches the documents stored in the document storage 122 using the search query, and retrieves documents containing words in the search query as search results. That is, in reference to the document storage 122 that stores the multiple documents, the retriever 132 retrieves the documents containing the words in the received search query from among the multiple documents. Here, if an important word is added to the search query, the retriever 132 retrieves documents containing the important word. In other words, the retriever 132 retrieves documents containing selected one or more words from among the multiple documents by referring to the document storage 122. The retriever 132 outputs the retrieved documents, that is, search results together with the search query to the extractor 133 and the output controller 135. The retriever 132 is an example of a first retriever and a second retriever.

Instead, upon receipt of a submission of any word among one or more words displayed, the retriever 132 may retrieve documents containing the submitted word from among the multiple documents by referring to the document storage 122. Alternatively, upon receipt of a submission of any word among the one or more words displayed, the retriever 132 may retrieve documents containing both of the multiple words in the search query and the submitted word from among the multiple documents by referring to the document storage 122.

Here, a search query and search results are explained using FIG. 3. FIG. 3 is a diagram illustrating an example of a search query and search results in a first search. Table 20 in FIG. 3 includes items of, for example, "No.", "search query and search result", and "category". The "No." cell indicates a number that identifies each of the search query and the search results. The "search query and search result" cell indicates a search query or a search result. The "category" cell indicates whether the associated sentence or the like is a search query or a search result. In the category cell, "question" indicates the search query and "answer" indicates the search result. Since the example of FIG. 3 illustrates the first search, the search query is one sentence, "sora no iro wa naniiro desuka (what color is the color of sky?)". Then, as search results, the following three sentences are assumed to be retrieved: "hiruma no sora wa aoi (the sky at daytime is blue)"; "asa ya yugata no sora wa akai (the sky at morning and evening is red)"; and "yore no sora wa kuroi (the sky at night is black)", for example.

Here, return to the explanation of FIG. 2. Upon input of the search query and the search results from the retriever 132, the extractor 133 extracts words from the search query and the search results by using, for example, morphological analysis. The extractor 133 calculates the IDF of each of the extracted words by using, for example, the following formula (1):

$$IDF_i = \log\frac{|D|}{DF_i} \quad (1)$$

Here, the $IDF_i$ denotes the IDF of a word i, D denotes the total number of documents, and $DF_i$ denotes the number of documents in which the word i appears.

The extractor 133 further extracts words each having the IDF equal to or higher than the threshold from all the extracted words. In other words, the extractor 133 extracts multiple words contained in the retrieved documents. The extractor 133 outputs the extracted words to the selector 134 as the words having high IDF together with category information indicating that each of the words is contained in a search query or search result.

Here, using FIGS. 4 to 6, description is provided for extraction of words having high IDF. FIG. 4 is a diagram illustrating an example of morphological analysis. An example of Table 21 illustrated in FIG. 4 presents word groups extracted by the morphological analysis respectively from the search query and the search results in Table 20 of FIG. 3. The extractor 133 extracts each of the words in the word groups and calculates the IDF of the extracted word.

FIG. 5 is a diagram illustrating an example of the IDF of each word. Table 22 in FIG. 5 includes items of, for example, "No.", "word", "IDF", and "category". The "No." cell indicates the number identifying each word. The "word" cell presents each word extracted by the morphological analysis. The "IDF" cell indicates the IDF of the associated word. The "category" cell indicates which of the search query and the search result the associated word is contained in. In the category cell, "question" indicates that the associated word is contained in the search query, and "answer" indicates that the associated word is contained in the search result. In the example in FIG. 5, the word "sora (sky)" is contained in all the rows of the search query and search results in Table 20 illustrated in FIG. 3, and therefore has an IDF=0. Meanwhile, the word "iro (color)" is contained in the row (the row No. 1) of the search query but is not contained in the rows (the rows Nos. 2 to 4) of the search results. Thus, the word "iro (color)" has an IDF=0.6.

FIG. 6 is a diagram presenting an example of words having high IDF (also referred to as high-IDF words). Table 23 in FIG. 6 presents the example of high-IDF words in the case where words having the IDF of "0.5" or higher, for example, are extracted from the words in Table 22 in FIG. 5. Table 23 includes items such, for example, as "No.", "word group", and "category". The "No." cell indicates a category number of a word group. The "word group" cell indicates high-IDF words contained in the search query or the search results. The "category" cell indicates which of the search query and the search result the associated words are contained in. In the category cell, "question" indicates that the words are contained in the search query, and "answer" indicates that the words are contained in the search results.

Returning to the explanation of FIG. 2, the selector 134 generates a learning model based on training data. In addition, using the learning model generated, the selector 134 calculates the similarity between each of the high-IDF words in the search query and each of the high-IDF words in the search results.

To begin with, the generation of the learning model is explained. The selector 134 obtains training data and the like from the other information processing apparatus not illustrated through the communication unit 110 before execution of the information output processing. The selector 134 performs machine learning based on the obtained training data, and thereby generates a learning model. The selector 134 stores the generated learning model into the learning model storage 121. In other words, the selector 134 performs the machine learning about the field targeted for the information output processing to be provided by the information processing apparatus 100, and generates the learning model.

Next, the calculation of the similarity is explained. The selector 134 receives input of the high-IDF words and the category information from the extractor 133. The selector 134 performs vector conversion of the high-IDF words inputted. The selector 134 calculates the similarity between each of the high-IDF words in the search query and each of the high-IDF words in the search results based on the category information. The vector conversion and the similarity calculation may be done by applying, for example, a method of converting words into vectors and calculating the cosine similarity, a method using Word2Vec that converts words to vectors and output the similarity, or the like.

Here, the similarity calculation in the case of using the cosine similarity is explained using FIG. 7. FIG. 7 is a diagram illustrating an example of the vector conversion and the similarity calculation. In the example in FIG. 7, the selector 134 converts the words "ka (?)" and "ya (and)" to vectors [1, 0, 1] and [1, 0, 0], respectively. The selector 134 calculates the cosine similarity by assigning [1, 0, 1]=A and [1, 0, 0]=B, thereby obtaining 0.70. In sum, the cosine similarity between the words "ka (?)" and "ya (and)" is 0.70 in the example in FIG. 7.

The selector 134 associates each word with the calculated similarity to form the similarity-attached word. The selector 134 sorts the similarity-attached words in ascending order of the similarity. FIG. 8 is a diagram illustrating an example in which the words are sorted in ascending order of the similarity. Table 24 of FIG. 8 is a table in which the words with the category "answer" in Table 23 of FIG. 6 are sorted in the ascending order of the similarity. Table 24 includes items of, for example, "No.", "word", "similarity", and "category". The "No." cell indicates a number identifying each word. The "word" cell presents a similarity-attached word. The "similarity" cell indicates the similarity associated with the word. The "category" cell indicates which of the search query and the search result word is contained in. In the category cell, "answer" represents that the word is contained in the search result. Here, "question" in the category cell represents that the word is contained in the search query, but the example in FIG. 8 does not include the words with the category cell of "question" because the similarity of each of the words in the search results (with the category cell of "answer") to the words in the search query (with the category cell of "question") is obtained.

The selector 134 selects one or more words having the lowest similarity based on the list table of similarity-attached words sorted in the ascending order of the similarity, for example, based on Table 24 illustrated in FIG. 8. The selector 134 outputs the selected words as important words to the output controller 135.

Specifically, the selector 134 selects one or more words from the extracted words by using an algorithm that selects words by giving a higher priority to a word with lower similarity to the words contained in the received search query. This algorithm also serves as an algorithm that selects words by giving a higher priority to a word with a higher IDF, that is, inverse document frequency.

Returning to the explanation of FIG. 2, the output controller 135 receives the search query and the search results inputted from the retriever 132. When receiving the important words from the selector 134, the output controller 135 generates a display screen on which the search query and the search results are displayed and the important words are also displayed as options submittable by the user. The output controller 135 causes the display unit 111 to display the generated display screen. In other words, the selector 134 selects one or more words having the lowest similarity as important words, and the output controller 135 generates the display screen on which both of the search results and the optionally-submittable important words are displayed. In addition, if the search query contains an important word, the output controller 135 generates a display screen according to the search results retrieved for the search query containing the important word.

In other words, the output controller 135 outputs information on the retrieved documents. Moreover, the output controller 135 causes the display unit 111 to display the selected one or more words.

Figure 9:
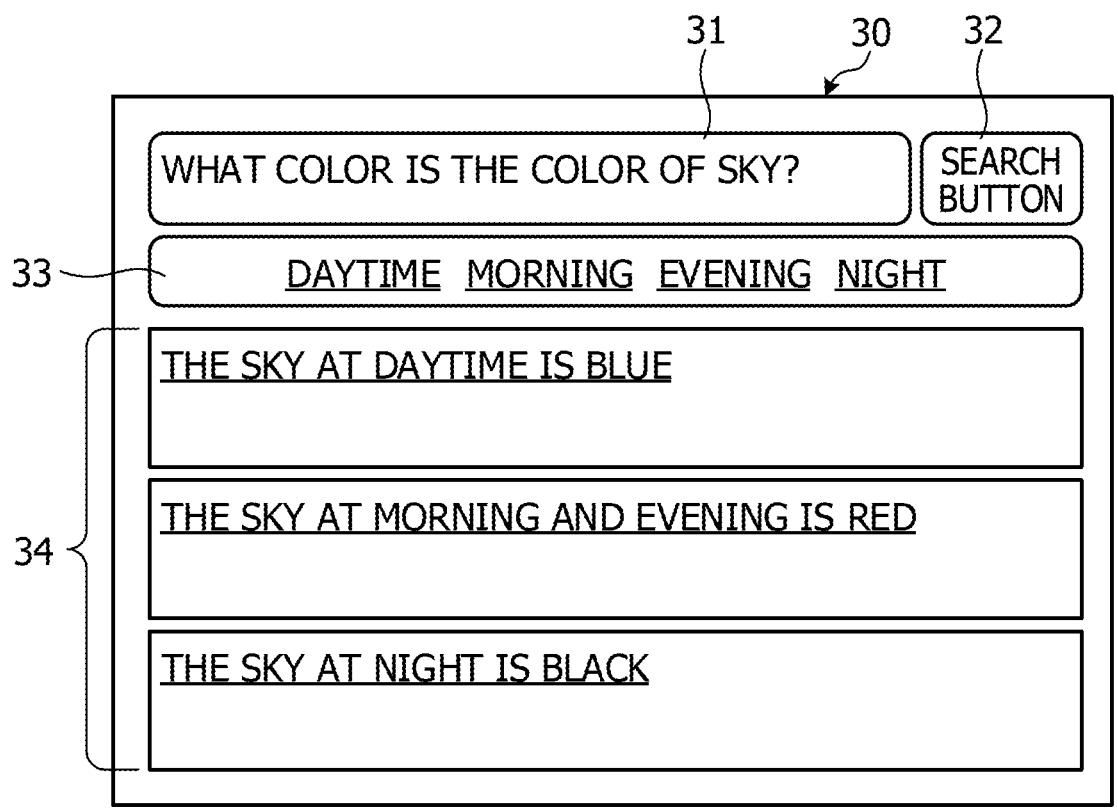
FIG. 9 is a diagram illustrating an example of a display screen of search results.
Figure 10:
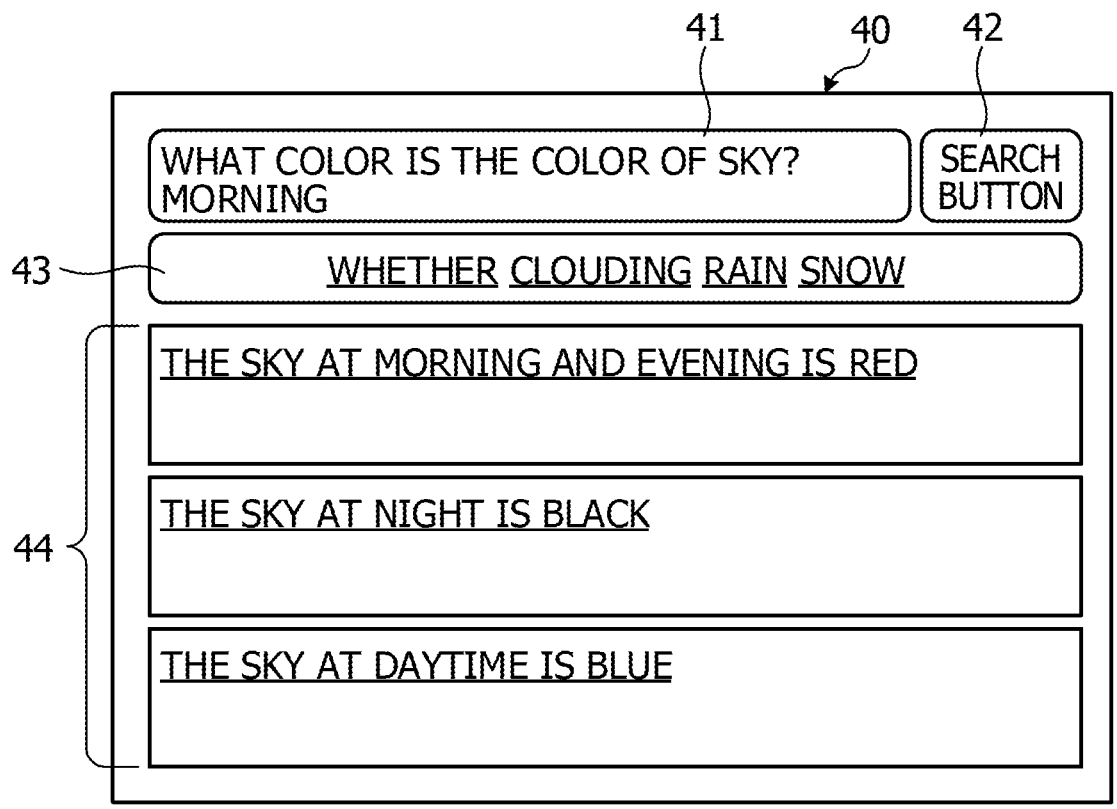
FIG. 10 is a diagram illustrating an example of a display screen of search results for a search query containing an important word.

Here, the display screens of the search results are explained using FIGS. 9 and 10. FIG. 9 is a diagram illustrating an example of a display screen of search results. A display screen 30 illustrated in FIG. 9 is a display screen just after the first search, more specifically, after search results are retrieved in response to reception of a search query from the user. The display screen 30 includes a search field 31, a search button 32, an important word field 33, and a search result field 34. The search field 31 displays the search query inputted by the user. The search button 32 is a button for search execution to be pressed after the search query is inputted to the search field 31. The important word field 33 displays, as important words, words having the lowest similarity to the words contained in the search query inputted in the search field 31. The search result field 34 displays the search results retrieved for the search query inputted in the search field 31. In the display screen 30, for example, when the search button 32 is pressed with "what color is the color of sky?" inputted in the search field 31, "daytime", "morning", "evening", and "night" are displayed in the important word field 33. In addition, in the search result field 34, search results such as "the sky at daytime is blue", "the sky at morning and evening is red", and "the sky at night is black" are displayed in descending order of the hit score of the search result.

FIG. 10 is a diagram illustrating an example of a display screen of search results for a search query containing an important word. A display screen 40 illustrated in FIG. 10 is a display screen in the case where the user chooses "morning" in the important word field 33 in the state of the display screen 30 in FIG. 9. The display screen 40 includes a search field 41, a search button 42, an important word field 43, and a search result field 44. In the search field 41, the search query inputted by the user and the important word chosen in the display screen 30 are displayed. The search button 42 is a button for search execution to be pressed after the search query and the important word are displayed in the search field 41. The important word field 43 displays, as important words, words having the lowest similarity to the words in the search query which is inputted in the search field 41 and which contains the important word. The search result field 44 displays the search results retrieved for the search query which is inputted in the search field 41 and which contains the important word. In the display screen 40, for example, when the search button 42 is pressed with "what color is the color of sky? morning" displayed in the search field 41, "weather", "clouding, "rain", and "snow" are displayed in the important word field 43. In addition, in the search result field 44, the search results such as "the sky at morning and evening is red, "the sky at night is black", and "the sky at daytime is blue" are displayed in descending order of the hit score of the search result. In sum, the search results reflecting the important word of "morning" chosen in the display screen 30 are displayed in the display screen 40.

Figure 11:
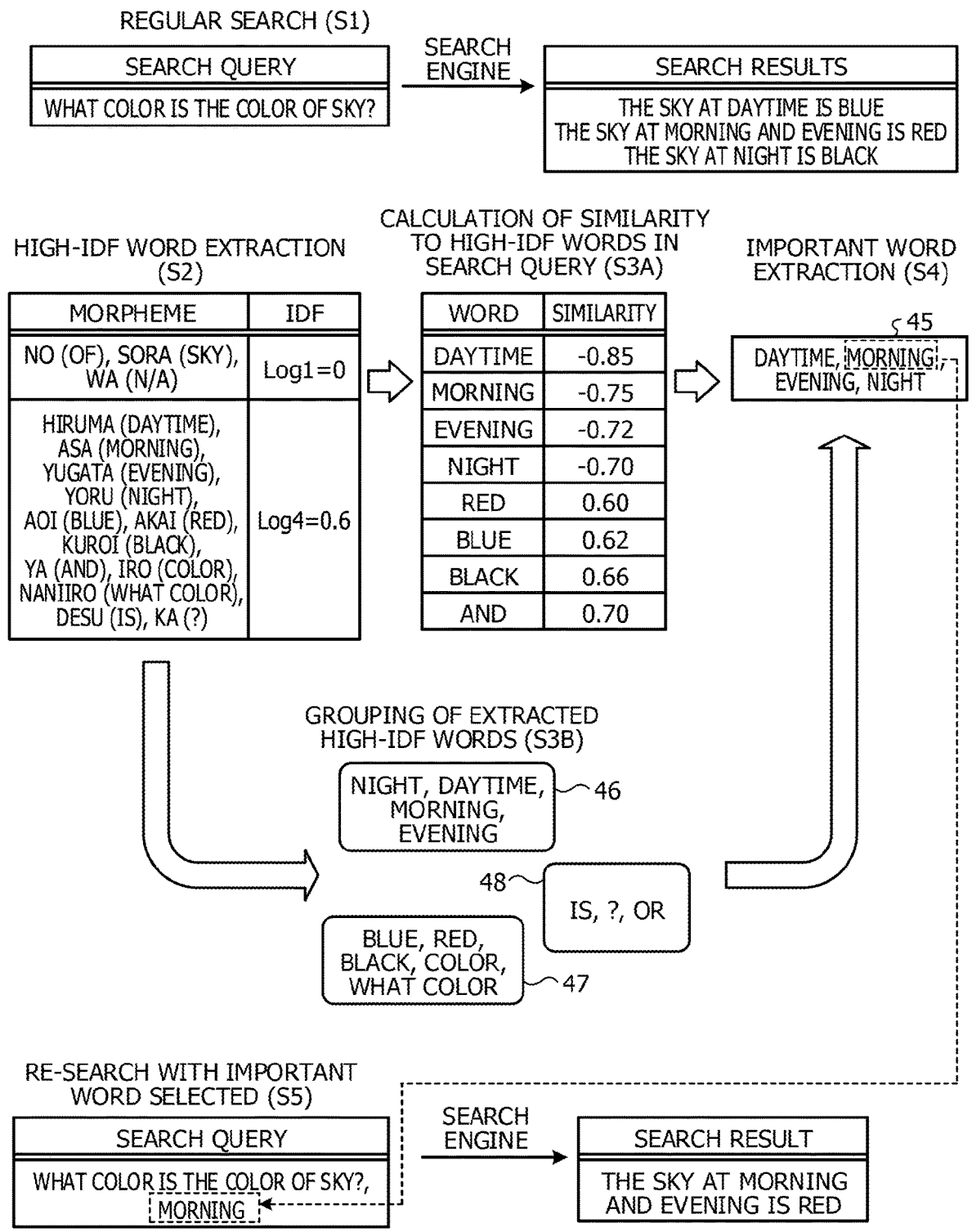
FIG. 11 is a diagram illustrating a detailed example of a search in Embodiment 1.

Hereinafter, a flow of the above search is explained using FIG. 11. FIG. 11 is a diagram illustrating a detailed example of the search in Embodiment 1. As illustrated in FIG. 11, upon receipt of "what color is the color of sky?" as a search query, the information processing apparatus 100 executes a regular search (first search) (step S1). Here, the search results obtained are "the sky at daytime is blue", "the sky at morning and evening is red", and "the sky at night is black". Subsequently, the information processing apparatus 100 extracts high-IDF words (step S2). The information processing apparatus 100 calculates the similarity of the high-IDF words in the search results to the high-IDF words in the search query (step S3A). The information processing apparatus 100 extracts words having the lowest similarity as important words 45 (step S4) and displays the extracted words as options submittable by the user. The important words 45 extracted are, for example "daytime", "morning", "evening", and "night".

Alternatively, instead of step S3A, the information processing apparatus 100 may classify the extracted high-IDF words into classes or in other words into groups of analogous words (step S3B). In the example in FIG. 11, there are a group 46 classified by "time", a group 47 classified by "color", and a group 48 classified by "others". In this case, the information processing apparatus 100 may extract, as the important words 45, for example, the words in the group 46 not including any of the words in the search query (step S4).

Here, the functional units that execute the above classification into the classes in the information processing apparatus 100 are the retriever 132 and the selector 134. The selector 134 classifies the extracted words into classes of analogous words, and selects one of the classes obtained by the classification. The retriever 132 retrieves the documents containing the words classified in the selected class from among the multiple documents by referring to the document storage 122.

When the user submits, for example, "morning" from the important words 45, the information processing apparatus 100 selects the important word, more specifically, adds "morning" to the search query and then executes a re-search (step S5). As a result of the re-search, the information processing apparatus 100 retrieves a search result of "the sky at morning and evening is red". In this case, the information processing apparatus 100 may retrieve multiple search results in descending order of the hit score of the search result.

Figure 12:
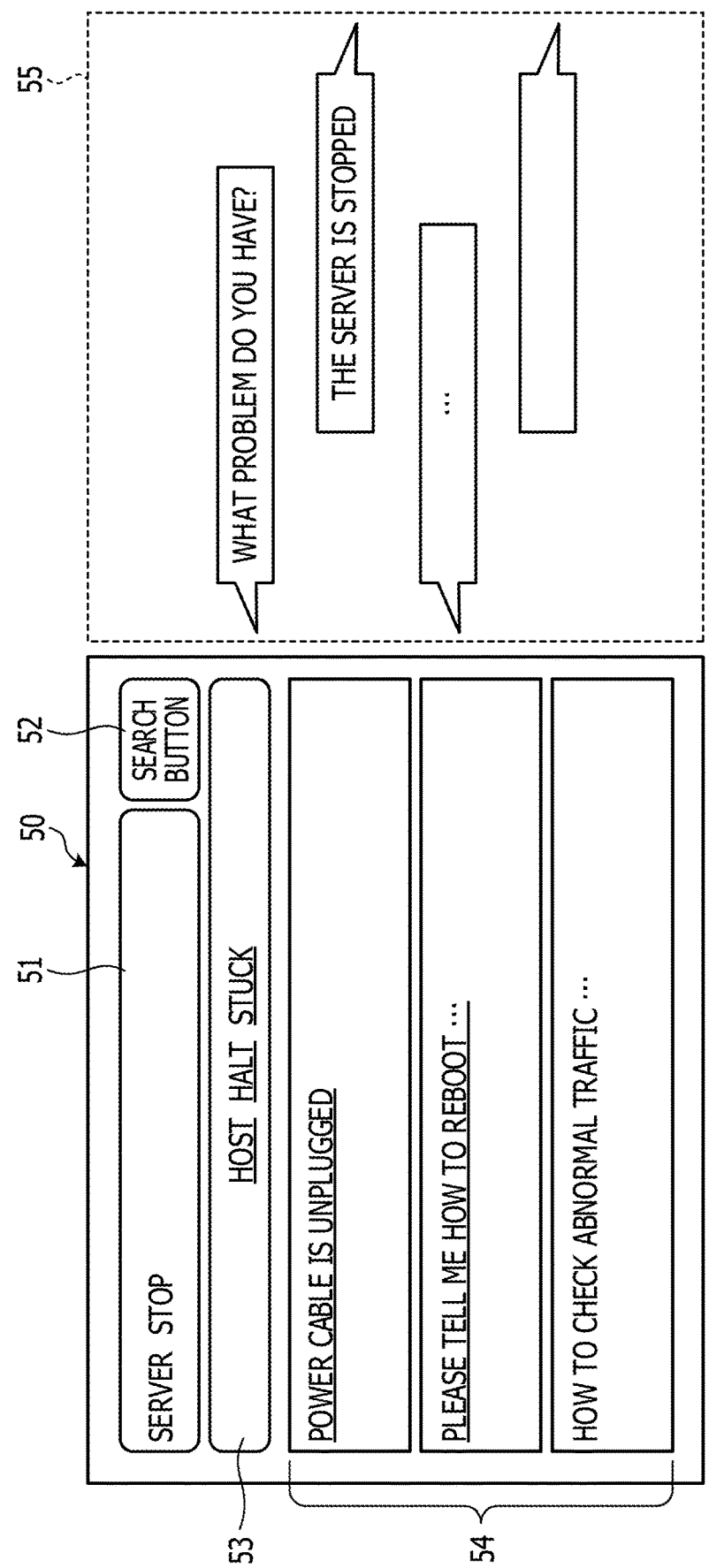
FIG. 12 is a diagram illustrating an example of a dialogue in the case where words having high similarity are displayed.
Figure 13:
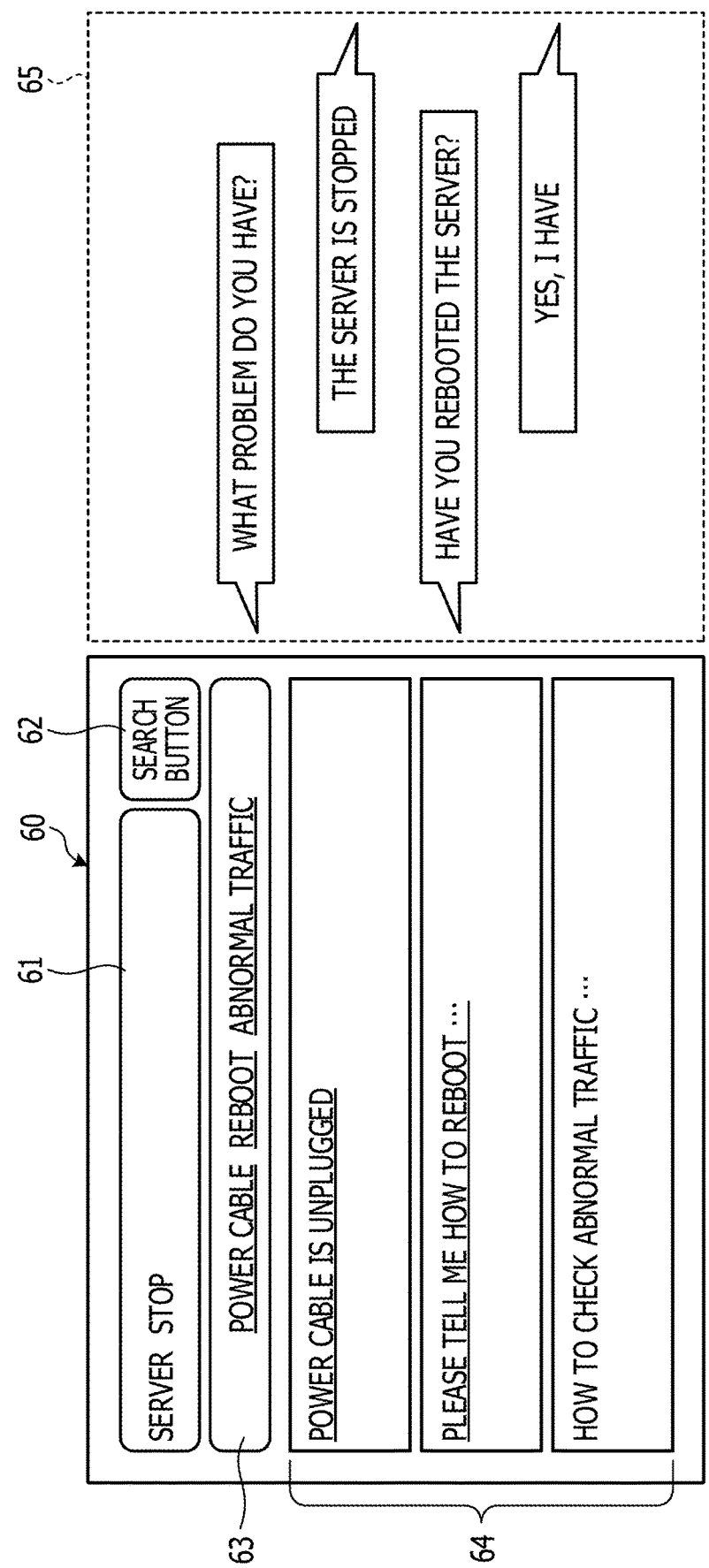
FIG. 13 is a diagram illustrating an example of a dialogue in the case where words having low similarity are displayed.

Next, using FIGS. 12 and 13, description is provided for a comparison between a case where words having high similarity are displayed as important words in a call center, and a case where words having low similarity are displayed as important words in the call center. FIG. 12 is a diagram illustrating an example of a dialogue in the case where the words having high similarity are displayed. As illustrated in FIG. 12, a display screen 50 includes a search field 51, a search button 52, an important word field 53, and a search result field 54. The search field 51 displays a search query inputted by a user. The search button 52 is a button for search execution to be pressed after the search query is inputted to the search field 51. The important word field 53 displays, as important words, words having high similarity to the words contained in the query inputted to the search field 51. The search result field 54 displays search results retrieved for the search query inputted to the search field 51.

When an operator in the call center receives, for example, an inquiry about a stoppage of a server from a client as illustrated in a dialogue example 55, the operator inputs "server stop" in the search field 51 of the display screen 50, and presses the search button 52. Then, the important word field 53 displays words having high similarity to the words inputted to the search field 51, more specifically, "host", "halt", and "stuck". In addition, the search result field 54 displays search results retrieved for "server stop", such as "the power cable is unplugged", "Please tell me how to reboot . . . ", and "How to check an abnormal traffic . . . ". In this case, even though the operator desires to ask a further question to the client in reference to the words contained in the important word field 53, it is difficult for the operator to ask a further question in a new aspect in reference to the important word field 53 because all the words in the important word field 53 have high similarity to the words in the search field 51.

FIG. 13 is a diagram illustrating an example of a dialogue in the case where the words having low similarity are displayed. As illustrated in FIG. 13, a display screen 60 includes a search field 61, a search button 62, an important word field 63, and a search result field 64. The search field 61 displays a search query inputted by a user. The search button 62 is a button for search execution to be pressed after the search query is inputted to the search field 61. The important word field 63 displays, as important words, words having low similarity to the words contained in the search query inputted to the search field 61. The search result field 64 displays search results retrieved for the search query inputted to the search field 61.

When an operator in the call center receives, for example, an inquiry about a stoppage of a server from a client as illustrated in a dialogue example 65, the operator inputs "server stop" in the search field 61 of the display screen 60, and presses the search button 62. Then, the important word field 63 displays words having low similarity to the words inputted to the search field 61, more specifically, "power cable", "reboot", and "abnormal traffic". In addition, the search result field 64 displays search results retrieved for "server stop", such as "the power cable is unplugged", "Please tell me how to reboot . . . ", and "How to check an abnormal traffic . . . ". In this case, when the operator decides a question to be asked to the client with reference to the words contained in the important word field 63, the operator may pay attention to, for example, "reboot" in the important word field 63 and ask "Have you rebooted the server?" to the client. In this way, as compared with the display of words having high similarity as important words, the display of words having low similarity as important words may encourage asking of a question in a different aspect and therefore contribute to the solution to the problem.

Figure 14:
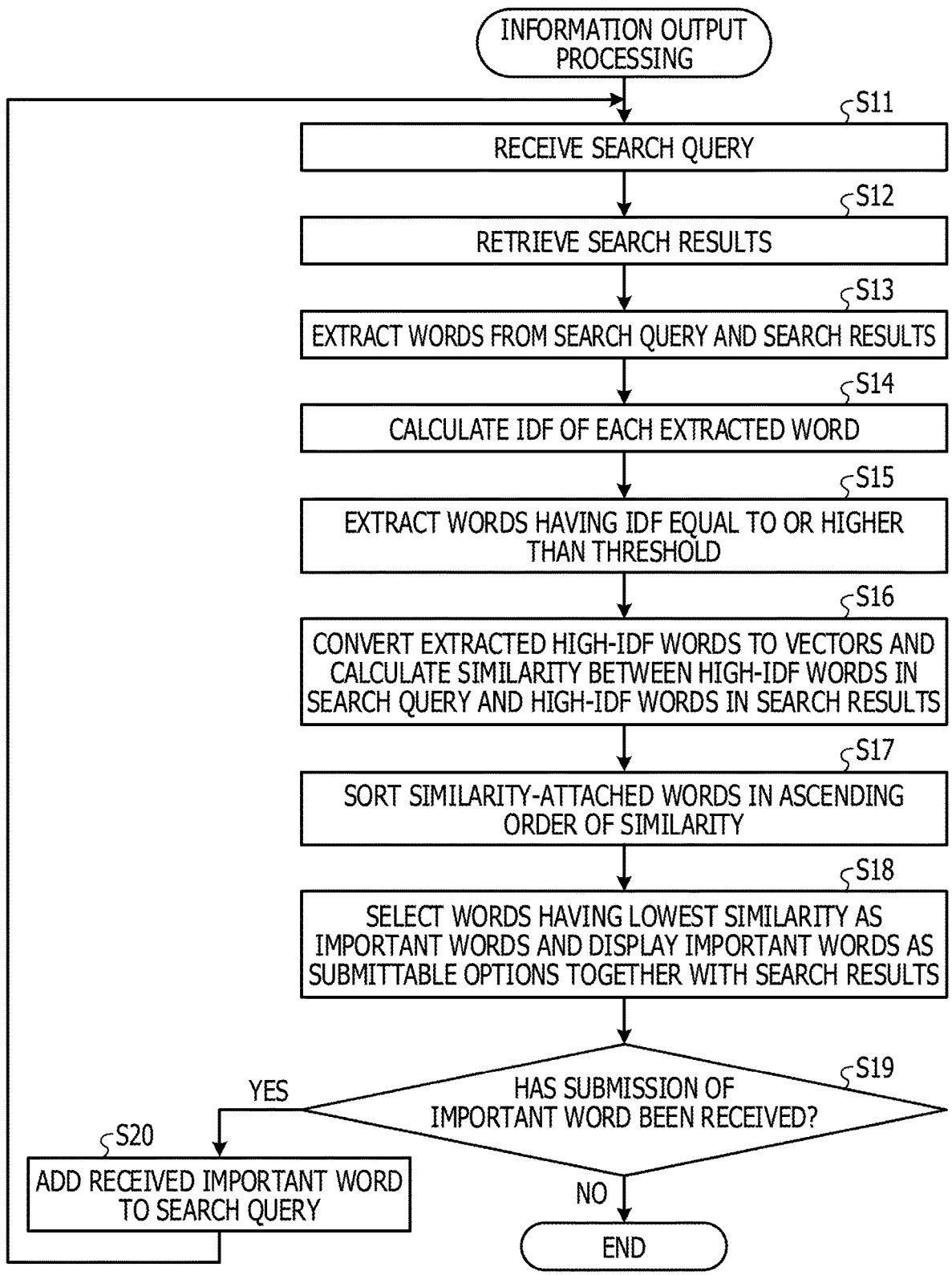
FIG. 14 is a flowchart presenting an example of information output processing in Embodiment 1.

Next, an operation of the information processing apparatus 100 in Embodiment 1 is explained. FIG. 14 is a flowchart presenting an example of the information output processing in Embodiment 1.

The receiver 131 receives a search query inputted according to an operation on the operation unit 112 by a user, for example (step S11). The receiver 131 outputs the received search query to the retriever 132.

Upon input of the search query from the receiver 131, the retriever 132 searches the documents stored in the document storage 122 by using the search query, and retrieves the search results (step S12). The retriever 132 outputs the retrieved search results together with the search query to the extractor 133 and the output controller 135.

Upon input of the search query and the search results from the retriever 132, the extractor 133 extracts words from the search query and the search results by using, for example, morphological analysis (step S13). The extractor 133 calculates the IDF of each of the extracted words (step S14). The extractor 133 further extracts words each having the IDF equal to or higher than the threshold from among the extracted words (step S15). The extractor 133 outputs the extracted words as high-IDF words together with the category information to the selector 134.

Upon input of the high-IDF words and the category information from the extractor 133, the selector 134 converts the inputted high-IDF words into vectors. The selector 134 calculates the similarity between the high-IDF words in the search query and the high-IDF words in the search results based on the category information (step S16). The selector 134 associates each word with the calculated similarity to form the similarity-attached word. The selector 134 sorts the similarity-attached words in the ascending order of the similarity (step S17). The selector 134 selects one or more words having the lowest similarity based on a list table of the similarity-attached words sorted in the ascending order of the similarity. The selector 134 outputs the selected words as important words to the output controller 135.

In other words, the selector 134 sets the words having the lowest similarity as the important words. Upon input of the important words from the selector 134, the output controller 135 generates a display screen to display the important words as submittable options together with search results. The output controller 135 causes the display unit 111 to display the generated display screen (step S18).

The receiver 131 determines whether or not the receiver 131 has received a submission of any of the important words which are displayed as submittable options on the display unit 111 by the output controller 135 (step S19). If determining that a submission of an important word has been received (step S19: Yes), the receiver 131 adds the received important word to the search query to create a new search query (step S20), outputs the new search query to the retriever 132, and returns to step S11. If determining that a submission of an important word has not been received (step S19: No), the receiver 131 terminates the information output processing. In this way, the information processing apparatus 100 may enhance the search accuracy. In addition, the information processing apparatus 100 may shorten a time period to be consumed for search refinement.

Note that although the documents stored in the document storage 122 in the information processing apparatus 100 are searched in Embodiment 1 described above, this is just a non-limiting example. For example, the information processing apparatus 100 may send a received search query to a search engine that searches multiple documents and outputs search results, and retrieve documents containing the words in the search query as search results for the search query. In this case, for example, an external search engine or search service may be used as the search engine. Also in the case where an important word is submitted, the search may use the external search engine as well. For example, the information processing apparatus 100 sends selected one or more words to the search engine, and retrieves documents containing the selected one or more words from among multiple documents. In this way, the information processing apparatus 100 is able to search not only documents stored in its own document storage 122, but also documents held in the external search engine.

As described above, the information processing apparatus 100 receives a search query. Then, in reference to the document storage 122 that stores multiple documents, the information processing apparatus 100 retrieves a document containing a word in the received search query. Thereafter, the information processing apparatus 100 extracts multiple words contained in the retrieved document. The information processing apparatus 100 selects one or more words from among the extracted words by using the algorithm that selects words by giving a higher priority to a word with lower similarity to the word in the received search query. The information processing apparatus 100 retrieves a document containing the selected one or more words from among the multiple documents by referring to the document storage 122. Then, the information processing apparatus 100 outputs information on the retrieved document. As a result, the information processing apparatus 100 may enhance the search accuracy.

In addition, the information processing apparatus 100 displays the selected one or more words on the display unit 111. Upon receipt of a submission of any of the one or more words displayed, the information processing apparatus 100 retrieves a document containing the submitted word from among the multiple documents by referring to the document storage 122. As a result, the information processing apparatus 100 may enhance the search accuracy while reflecting the user's submission of the word.

Alternatively, upon receipt of a submission of any word from among the one or more words displayed, the information processing apparatus 100 retrieves a document containing multiple words in the search query and the submitted word from among the multiple documents by referring to the document storage 122. As a result, the information processing apparatus 100 may enhance the search accuracy while reflecting the user's submission of the word.

Instead, the information processing apparatus 100 classifies the extracted words into classes of analogous words, and selects one of the classes obtained by the classification. The information processing apparatus 100 retrieves a document containing the words classified in the selected class from among the multiple documents by referring to the document storage 122. As a result, the information processing apparatus 100 may enhance the search accuracy while reflecting a user's submission of a class.

Then, the algorithm that selects words in the information processing apparatus 100 is an algorithm that selects words by giving a higher priority to a word with a higher inverse document frequency. This may result in enhancement of the search accuracy by the information processing apparatus 100.

In another case, the information processing apparatus 100 receives a search query. The information processing apparatus 100 sends the received search query to a search engine configured to search multiple documents and output the search results, and retrieves a document containing a word in the search query as a search result for the search query. Then, the information processing apparatus 100 extracts multiple words contained in the retrieved document. The information processing apparatus 100 selects one or more words from among the extracted words by using an algorithm that selects words by giving a higher priority to a word with lower similarity to the word in the received search query. The information processing apparatus 100 sends the selected one or more words to the search engine, and retrieves a document containing the selected one or more words from among the multiple documents. Moreover, the information processing apparatus 100 outputs information on the retrieved document. As a result, the information processing apparatus 100 may enhanced the search accuracy while advantageously using the external search engine.

Embodiment 2

Figure 15:
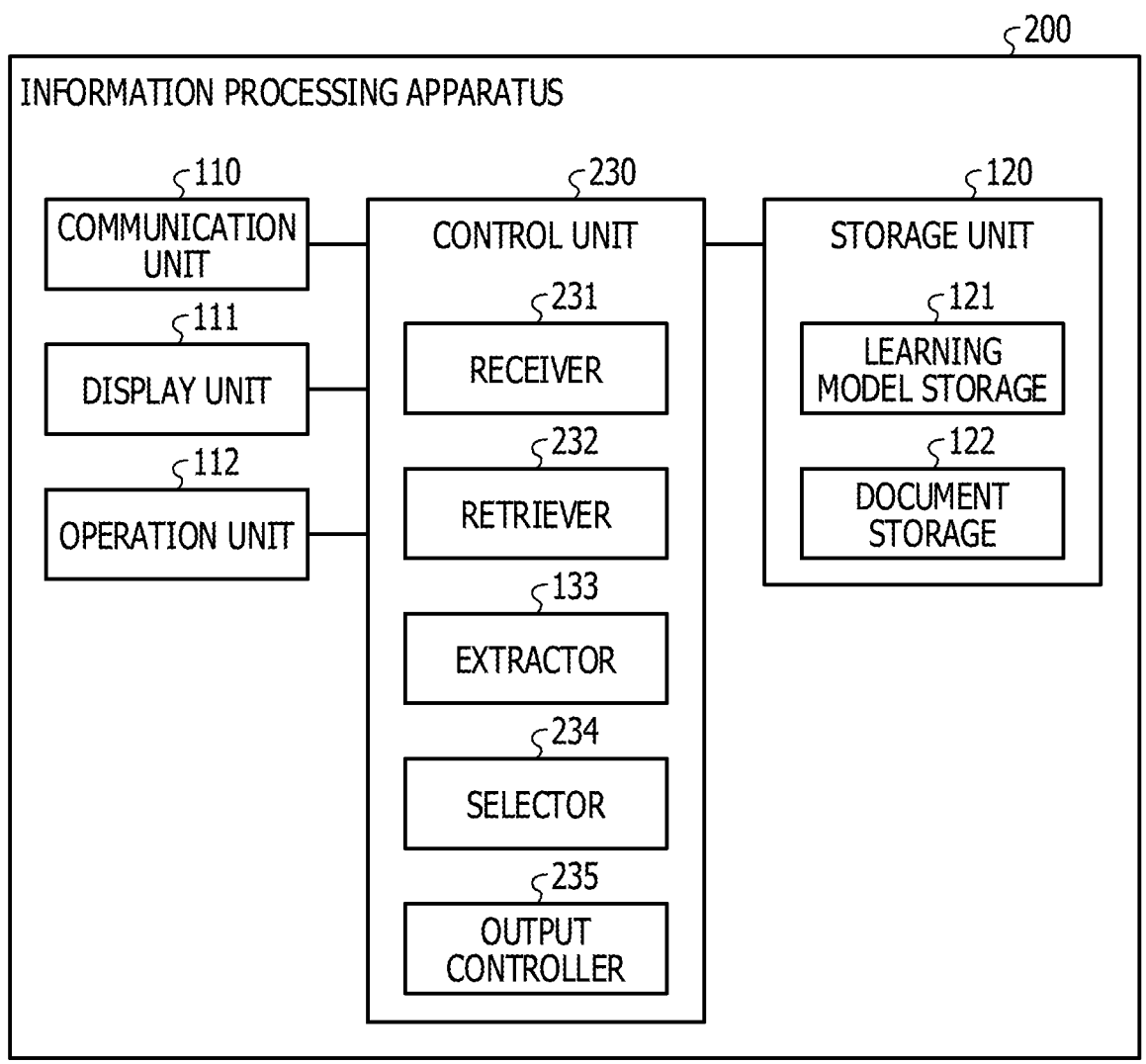
FIG. 15 is a block diagram illustrating an example of a configuration of an information processing apparatus in Embodiment 2.

In Embodiment 1 described above, the information processing apparatus 100 receives the submission of the important word from the user. Instead, for example, the selector 134 may select one or more words having the lowest similarity as important words and preform a re-search using a search query to which the selected words are added. The configuration implemented in this case is explained as Embodiment 2. FIG. 15 is a block diagram illustrating an example of a configuration of an information processing apparatus in Embodiment 2. The same components as those in the information processing apparatus 100 in Embodiment 1 are assigned with the same reference symbols, and thereby the same components and operations thereof are omitted from the explanation herein.

An information processing apparatus 200 in Embodiment 2 includes a control unit 230 in place of the control unit 130 as compared with the information processing apparatus 100 in Embodiment 1. Then, the control unit 230 includes a receiver 231, a retriever 232, a selector 234, and an output controller 235 in place of the receiver 131, the retriever 132, the selector 134, and the output controller 135, respectively, as compared with the control unit 130 in Embodiment 1.

The receiver 231 receives a search query inputted according to an operation on the operation unit 112 by a user, for example. The receiver 231 outputs the received search query to the retriever 232. In addition, if a search query with an important word added thereto is inputted from the selector 234, the receiver 231 receives the inputted search query and outputs the search query with the important word added thereto to the retriever 232.

Upon input of the search query from the receiver 231, the retriever 232 searches the documents stored in the document storage 122 by using the search query, and retrieves documents containing words in the search query as search results. Here, if the important word is added to the search query, the retriever 232 retrieves documents containing the important word.

The retriever 232 determines whether or not the search with the important word added to the search query has been done. If determining that the search with the addition of the important word has not been done, the retriever 232 outputs, as first search results, the retrieved documents, that is, the search results together with the search query to the extractor 133 and the output controller 235. The retriever 232 outputs the search query to the selector 234. Meanwhile, if determining that the search with the addition of the important word has been done, the retriever 232 outputs, as second search results, the retrieved documents, that is, the search results together with the search query to the output controller 235.

The selector 234 receives high-IDF words and the category information inputted from the extractor 133. In addition, the selector 234 receives the search query inputted from the retriever 232. The selector 234 converts the inputted high-IDF words into vectors. The selector 234 calculates the similarity between the high-IDF words in the search query and the high-IDF words in the search results based on the category information. The vector conversion and the similarity calculation may be done by applying, for example, a method of converting words into vectors and calculating the cosine similarity, a method using Word2Vec that converts words to vectors and outputs the similarity, or the like, as in Embodiment 1.

The selector 234 associates each word with the calculated similarity to form the similarity-attached word. The selector 234 sorts the similarity-attached words in ascending order of the similarity. The selector 234 selects one or more words having the lowest similarity as one or more important words based on the list table of the similarity-attached words sorted in the ascending order of the similarity, and adds the selected words to the search query. The selector 234 outputs the search query with the important words added thereto to the receiver 231.

The output controller 235 receives the first search results and second search results inputted from the retriever 232. Upon receipt of the second search results inputted from the retriever 232, the output controller 235 generates a display screen, based on the first search results and the second search results, on which the search results for the search query received from the user and the search results for the search query with the important words added thereto are displayed in a comparable manner. In short, the output controller 235 generates the display screen on which the first search results and the second search results are comparable. The output controller 235 causes the display unit 111 to display the generated display screen.

Note that Embodiment 1 may be applied to Embodiment 2, and the output controller 235 may display search results for a search query containing an important word submitted by a user, as the second search results in a manner comparable with the first search results.

In other words, the output controller 235 provides output in which information on documents containing the words in the search query from among the multiple documents is comparable with information on documents containing the one or more words or the submitted one or more words from among the multiple documents.

Figure 16:
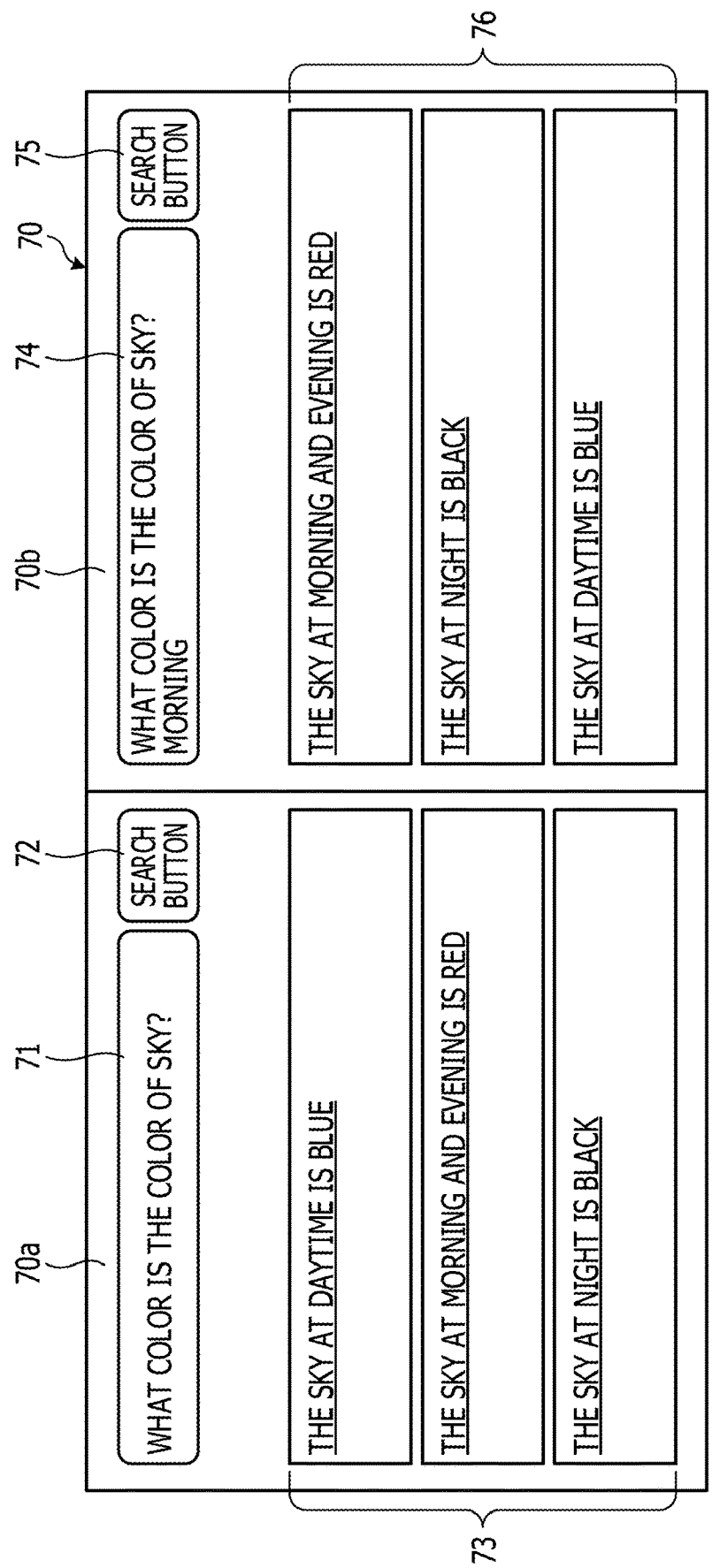
FIG. 16 is a diagram illustrating another example of a display screen of search results.

Here, a display screen on which search results are comparable to each other is explained using FIG. 16. FIG. 16 is a diagram illustrating another example of a display screen of search results. A display screen 70 illustrated in FIG. 16 includes a section 70a on which first search results for a search query received from the user are displayed, and a section 70b on which second search results for the search query with an important word added thereto are displayed. The section 70a includes a search field 71, a search button 72, and a search result field 73. The search field 71 displays a search query inputted by the user. The search button 72 is a button for search execution to be pressed after the search query is inputted to the search field 71. The search result field 73 displays the search results for the search query inputted to the search field 71.

The section 70b includes a search field 74, a search button 75, and a search result field 76. The search field 74 displays the search query with the important word added thereto. The search button 75 is a button for search execution to be pressed after the search query with the important word added thereto is displayed in the search field 74. The search result field 76 displays search results for the search query with the important word added thereto displayed on the search field 74. On the display screen 70, a difference between the search results depending on whether the important word is added or not may be easily understood by comparing the search result field 73 and the search result field 76 from each other. In addition, the section 70*b* may display important words as options submittable by the user as in Embodiment 1. Moreover, the section 70*b* may display the important word added to the search query in a selectable manner, and may delete the added important word when the added important word is selected by the user.

Figure 17:
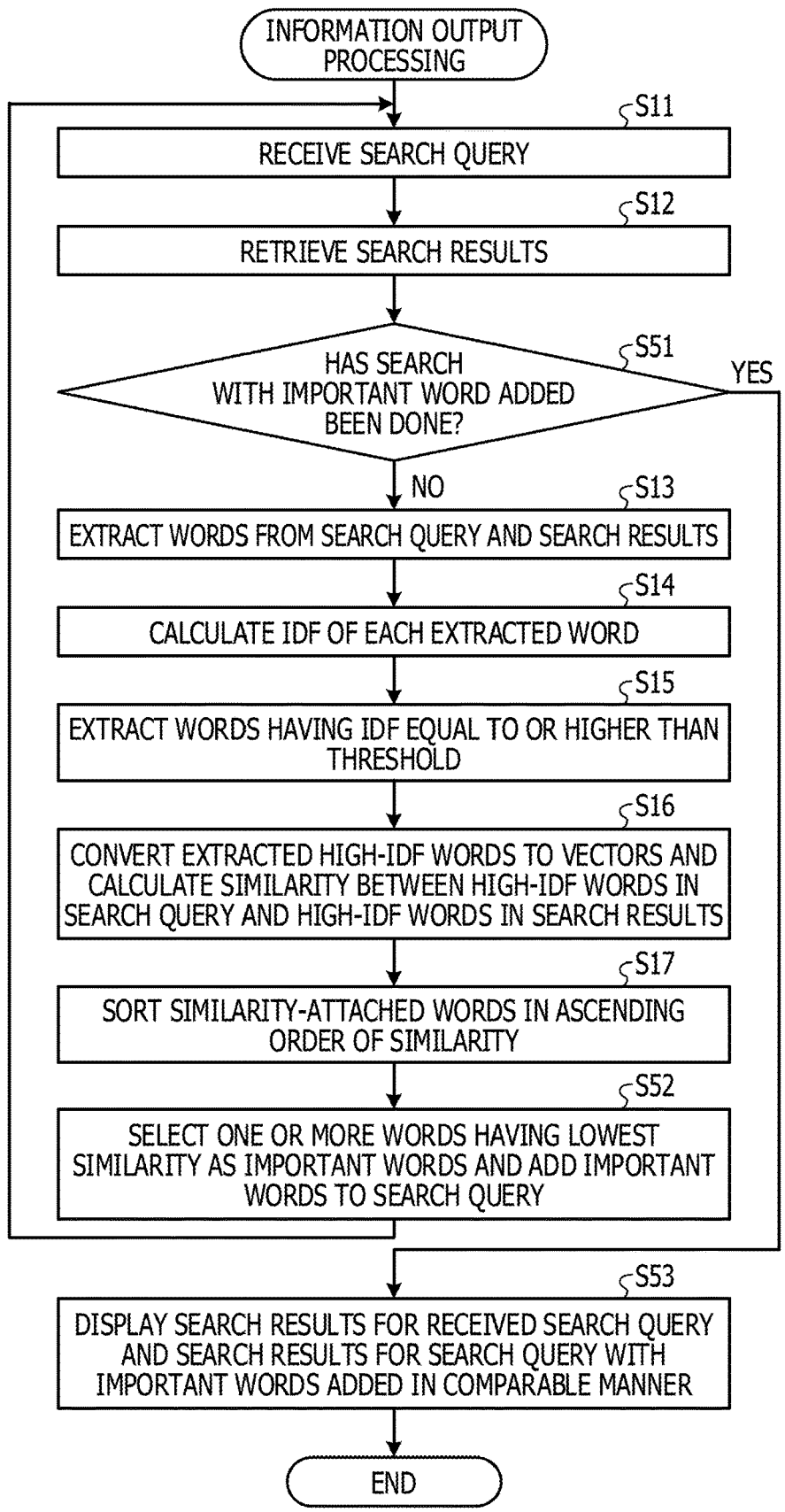
FIG. 17 is a flowchart presenting an example of information output processing in Embodiment 2.

Next, an operation of the information processing apparatus 200 in Embodiment 2 is explained. FIG. 17 is a flowchart presenting an example of the information output processing in Embodiment 2. The processes in steps S11 to S17 in the information output processing are the same as in Embodiment 1, and the explanation thereof are omitted in the following description.

The retriever 232 executes the following process next to the process in step S12. The retriever 232 determines whether or not the search with the important word added to the search query has been done (step S51). If determining the search with the addition of the important word has not been done (step S51: No), the retriever 232 outputs the first search results to the extractor 133 and the output controller 235, outputs the search query to the selector 234, and then advances to step S13. If determining the search with the addition of the important word has been done (step S51: Yes), the retriever 232 outputs the second search results to the output controller 235 and advances to step S53.

The selector 234 executes the following process next to the process in step S17. The selector 234 selects one or more words having the lowest similarity as one or more important words based on the list table of the similarity-attached words sorted in the ascending order of the similarity, and adds the selected one or more words to the search query (step S52). The selector 234 outputs the search query with the important words added thereto to the receiver 231 and advances to step S11.

The output controller 235 receives the second search results inputted from the retriever 232 if Yes is in step S51. The output controller 235 generates a display screen, based on the first search results and the second search results, on which the search results for the search query received from the user and the search results for the search query with the important words added thereto are displayed in a comparable manner. The output controller 235 causes the display unit 111 to display the generated display screen (step S53), and terminates the information output processing. In this way, the information processing apparatus 200 is capable of displaying the search results in a manner comparable between the case where the search query includes an important word, and the case where the search query includes no important word, and thereby may more enhance the search accuracy.

Thus, the information processing apparatus 200 provides output in which information on documents containing the words in the search query from among the multiple documents is comparable with information on documents containing the one or more words or the submitted one or more words from among the multiple documents. As a result, the information processing apparatus 200 is capable of displaying the search results in a manner comparable between the case where the search query includes an important word, and the case where the search query includes no important word, and thereby may more enhance the search accuracy.

Note that although the similarity between the words in the search query and the words in the search results is calculated in the embodiments described above, this is just a non-limiting example. For example, the similarity may be obtained by comparing sentences containing words or comparing documents containing sentences with each other. Here, the calculation of the similarity between sentences or documents may be done by using, for example, Doc2Vec.

In addition, the constituent elements of the units illustrated in the drawings do not have to be physically configured as illustrated in the drawings. In other words, the specific distribution or integration modes of the units are not limited to those illustrated in the drawings. The entireties or parts of the elements may be functionally or physically distributed among units or integrated into a single unit as appropriate in accordance with various kinds of conditions such as load and use conditions. For example, the receiver 131 and the retriever 132 may be integrated together. In addition, the order of the processes in the steps illustrated is not limited to the above order, but some of the steps may be performed simultaneously or be performed in an inverted order within a range in which the processing contents do not have a conflict.

Moreover, all or any part of the various kinds of processing functions implemented by the apparatuses may be executed on a CPU (or a microcomputer such as an MPU or a micro controller unit (MCU)). Instead, needless to say, all or any part of the various kinds of processing functions may be executed on a program analyzed and executed by the CPU (or the microcomputer such as the MPU or the MCU), or on hardware by wired logics.

Figure 18:
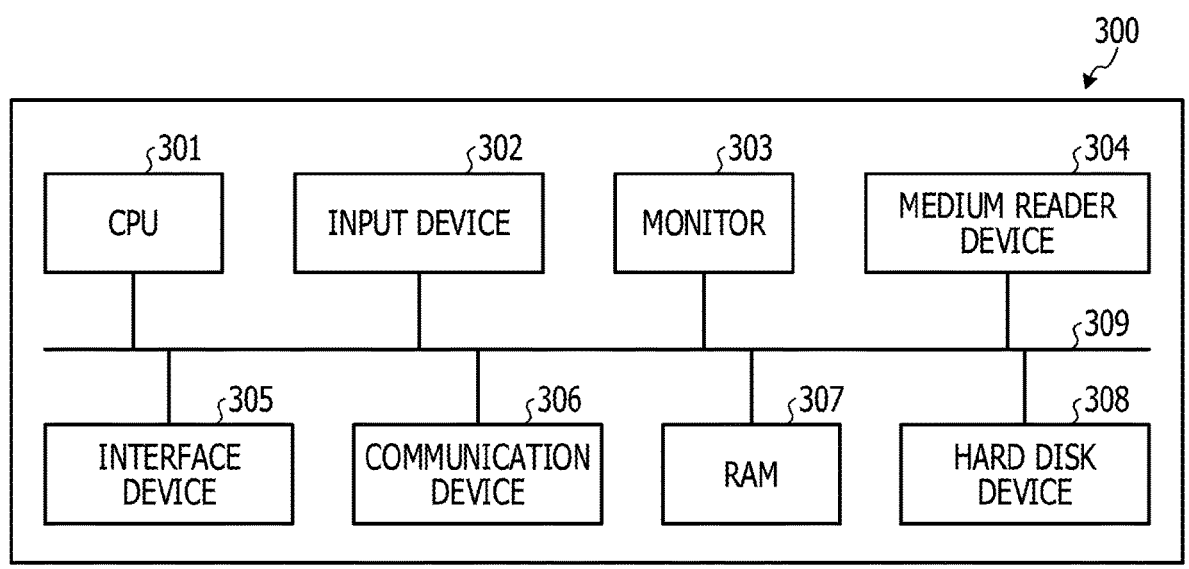
FIG. 18 is a diagram illustrating an example of a computer that runs an information output program.

Also, the various kinds of processing explained in the above embodiments may be executed by a computer running a program prepared in advance. Thus, the following description is provided for an example of a computer that runs a program having the same functions as those in the embodiments described above. FIG. 18 is a diagram illustrating an example of a computer that runs an information output program.

As illustrated in FIG. 18, a computer 300 includes a CPU 301 that executes various kinds of computation processing, an input device 302 that receives data input, and a monitor 303. In addition, the computer 300 includes a medium reader device 304 that reads programs and so on from storage media, an interface device 305 that serves for connection with various devices, and a communication device 306 that serves for wireless and wired connections with other information processing apparatuses and so on. In addition, the computer 300 includes a RAM 307 that temporarily stores various kinds of information, and a hard disk device 308. The devices 301 to 308 are connected to a bus 309.

The hard disk device 308 stores therein an information output program having the same functions as those in the processing units named the receiver 131, the retriever 132, the extractor 133, the selector 134, and the output controller 135 illustrated in FIG. 2. Alternatively, the hard disk device 308 may store therein an information output program having the same functions as those in the processing units named the receiver 231, the retriever 232, the extractor 133, the selector 234, and the output controller 235 illustrated in FIG. 15. Moreover, the hard disk device 308 stores therein various kinds of data for implementing the learning model storage 121, the document storage 122, and the information output program. The input device 302 receives, for example, input of various kinds of information such as operation information from a user of the computer 300. The monitor 303 displays, for example, various screens such as the aforementioned display screens to the user of the computer 300. The interface device 305 is connected to, for example, a printer and so on. The communication device 306 has the same functions as in the communication unit 110 illustrated in FIG. 2 or 15, for example, is connected to a network not illustrated, and exchanges various kinds of information with the other information processing apparatus and so on.

The CPU 301 performs various kinds of processing by reading the programs stored in the hard disk device 308, and expanding and executing the program on the RAM 307. These programs are capable of causing the computer 300 to function as the receiver 131, the retriever 132, the extractor 133, the selector 134, and the output controller 135 illustrated in FIG. 2. In another case, these programs are capable of causing the computer 300 to function as the receiver 231, the retriever 232, the extractor 133, the selector 234, and the output controller 235 illustrated in FIG. 15.

Here, the above information output program does not have to be stored in the hard disk device 308 in some cases. For example, the computer 300 may read and execute the program stored in any storage medium readable by the computer 300. Such a storage medium readable by the computer 300 is, for example, a portable recording medium such as a CD-ROM, a DVD disk, or a Universal Serial Bus (USB) memory, a semiconductor memory such as a flash memory, a hard disk drive, or the like. Further, this information output program may be stored in a device connected to the public line, the Internet, a LAN, or the like, and the computer 300 may read the information output program from the device and execute the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the process comprising:
   receiving a search query including a plurality of first words;
   obtaining, from a storage device that stores a plurality of documents, a first search result related to search result by using the received search query, the first search result being a document including a plurality of second words, at least any one of the plurality of second words being matched with one of the plurality of first words;
   extracting the plurality of first words from the search query;
   extracting the plurality of second words from the first search result obtained by using the search query;
   extracting, from the plurality of first words extracted from the search query, one or more third words whose Inverse Document Frequency (IDF) is equal to or greater than a predetermined threshold value, from the plurality of second words extracted from the first search result obtained by using the search query, from the plurality of first words and extracting one or more fourth words whose IDF is equal to or greater than the predetermined threshold value;
   selecting one or more words from among the one or more fourth words extracted from the plurality of second words included in the first search result, the one or more words having lower similarity to each of the one or more third words extracted from the plurality of first words included in the search query;
   obtaining a second search result by using the selected one or more words, the second search result being a document including at least a word matching any one of the selected one or more words; and
   outputting information corresponding to the second search result.

2. The non-transitory computer-readable storage medium according to claim 1, further comprising:
   displaying the one or more selected words on a screen of a display; and upon designating at least one word included in the one or more selected words, obtaining a third document containing the at least one designated word.

3. The non-transitory computer-readable storage medium according to claim 2, wherein:
   the third document further contains the word included in the received search query.

4. The non-transitory computer-readable storage medium according to claims 1, wherein:
   the outputting outputs information in which information corresponding to the first document and the information corresponding to the third document are comparable with each other.

5. The non-transitory computer-readable storage medium according to claims 2, wherein:
   the outputting outputs information in which information corresponding to the first document and the information corresponding to the second document are comparable with each other.

6. The non-transitory computer-readable storage medium according to claim 1, wherein the selecting includes:
   classifying the plurality of extracted words into a plurality of classes; wherein p1 the selecting selects the one or more words by selecting a class included in the plurality of classes.

7. The non-transitory computer-readable storage medium according to claim 1, wherein the obtaining the first document includes:
   transmitting the received search query to a search engine that searches the
   storage device and outputs a result of a searching; and
   receiving a result of a searching by the search engine.

8. An information processing method executed by a computer, the information processing method comprising:
   receiving a search query including a plurality of first words;
   obtaining, from a storage device that stores a plurality of documents, a first search result related to search result by using the received search query, the first search result being a document including a plurality of second words, at least any one of the plurality of second words being matched with one of the plurality of first words;
   extracting the plurality of first words from the search query,
   extracting the plurality of second words from the first search result obtained by using the search query;

extracting, from the plurality of first words extracted from the search query, one or more third words whose Inverse Document Frequency (IDF) is equal to or greater than a predetermined threshold value, from the plurality of second words extracted from the first search result obtained by using the search query, from the plurality of first words and extracting one or more fourth words whose IDF is equal to or greater than the predetermined threshold value;

selecting one or more words from among the one or more fourth words extracted from the plurality of second words included in the first search result, the one or more words having lower similarity to each of the one or more third words extracted from the plurality of first words included in the search query;

obtaining a second search result by using the selected one or more words, the second search result being a document including at least a word matching any one of the selected one or more words; and outputting information corresponding to the second document search result.

9. An information processing apparatus comprising:
a memory; and
a processor coupled to the memory and the processor configured to execute a process, the process including:
  receiving a search query including a plurality of first words;
  obtaining, from a storage device that stores a plurality of documents, a first search result by using the received search query, the first search result being a document including a plurality of second words, at least any one of the plurality of second words being matched with one of the plurality of first words;
  extracting the plurality of first words included in from the search query;
  extracting the plurality of second words included in from the first document search result obtained by using the search query;
  extracting, from the plurality of first words extracted from the search query, one or more third words whose Inverse Document Frequency (IDF) is equal to or greater than a predetermined threshold value, from the plurality of second words extracted from the first search result obtained by using the search query, from the plurality of first words and extracting one or more fourth words whose IDF is equal to or greater than the predetermined threshold value;
  selecting one or more words from among the one or more fourth words extracted from the plurality of second words included in the first search result, the one or more words having lower similarity to each of the one or more third words extracted from the plurality of first words included in the search query;
  obtaining a second search result by using the selected one or more words, the second search result being a document including at least a word matching any one of the selected one or more words; and
  outputting information corresponding to the second search result.

* * * * *